US009662963B2

(12) United States Patent
Schneider

(10) Patent No.: US 9,662,963 B2
(45) Date of Patent: May 30, 2017

(54) AIR DAMPER DEVICE HAVING A SEPARATE MOUNTING COMPONENT FOR SIMPLE ASSEMBLY

(71) Applicant: Röchling Automotive SE & Co. KG, Mannheim (DE)

(72) Inventor: Juergen Schneider, Worms (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 929 days.

(21) Appl. No.: 13/960,878

(22) Filed: Aug. 7, 2013

(65) Prior Publication Data

US 2014/0045418 A1    Feb. 13, 2014

(30) Foreign Application Priority Data

Aug. 7, 2012 (DE) .......................... 10 2012 213 992

(51) Int. Cl.
  *B60H 1/34* (2006.01)
  *B60H 1/00* (2006.01)
(52) U.S. Cl.
  CPC ....... *B60H 1/3421* (2013.01); *B60H 1/00678* (2013.01); *B60H 2001/00707* (2013.01)
(58) Field of Classification Search
  CPC ........... F24F 13/15; B60H 2001/00707; B60H 1/3421
  USPC ................................................. 454/155, 335
  See application file for complete search history.

(56) References Cited

U.S. PATENT DOCUMENTS

| 2,285,829 | A | * | 6/1942 | Maage, Jr. ................. | F16K 1/16 137/556 |
| 3,447,443 | A | * | 6/1969 | Silvey ..................... | F24F 13/08 137/601.09 |
| 3,783,768 | A | * | 1/1974 | Caming .................. | F24F 13/15 454/335 |
| 4,503,755 | A | * | 3/1985 | Nordquist ........... | F24F 13/1406 16/380 |
| 5,238,453 | A | * | 8/1993 | Heil ........................ | F24F 13/15 137/601.09 |

(Continued)

FOREIGN PATENT DOCUMENTS

| DE | 91 06 188.1 U1 | 2/1991 |
| DE | 4336905 C1 | 3/1995 |

(Continued)

*Primary Examiner* — Steven B McAllister
*Assistant Examiner* — Jonathan Cotov
(74) *Attorney, Agent, or Firm* — Rothwell, Figg, Ernst & Manbeck, P.C.

(57) ABSTRACT

An air damper device for a motor vehicle, comprising a device mount which defines a passage opening and on which at least one air damper extending along an air damper longitudinal axis is displaceably mounted in the region of at least one of its longitudinal ends as a mounting longitudinal end relative to the device mount, an opening cross-sectional area of the passage opening being alterable by displacement of the at least one air damper relative to the device mount, the mounting of the mounting longitudinal end of the air damper comprising a mounting component that has a mounting portion mounted on the device mount so as to be movable relative thereto in the fully assembled state of the air damper device and has a connection portion provided at an axial spacing thereto and connects the mounting portion to the air damper.

19 Claims, 5 Drawing Sheets

(56) References Cited

U.S. PATENT DOCUMENTS

| | | | | |
|---|---|---|---|---|
| 6,209,850 B1* | 4/2001 | Rafalski | ............... | F16K 1/224 |
| | | | | 251/308 |
| 6,250,012 B1* | 6/2001 | Ricci | ............... | E06B 7/086 |
| | | | | 49/74.1 |
| 6,848,213 B1* | 2/2005 | Swapp | ............... | E06B 7/096 |
| | | | | 49/74.1 |
| 8,500,528 B2* | 8/2013 | Leonhard | ............... | F24F 13/15 |
| | | | | 454/325 |
| 8,533,996 B1* | 9/2013 | Stone | ............... | E06B 7/096 |
| | | | | 49/403 |
| 2006/0099903 A1* | 5/2006 | Bowler | ............... | B60H 1/00678 |
| | | | | 454/121 |
| 2009/0149124 A1* | 6/2009 | Stevenson | ............... | B60H 1/00671 |
| | | | | 454/358 |
| 2009/0188273 A1* | 7/2009 | Dirnberger | ............... | F16K 31/521 |
| | | | | 62/404 |
| 2011/0126464 A1* | 6/2011 | Stone | ............... | E06B 7/096 |
| | | | | 49/82.1 |
| 2012/0110909 A1* | 5/2012 | Crane | ............... | B60K 11/085 |
| | | | | 49/70 |

FOREIGN PATENT DOCUMENTS

| | | |
|---|---|---|
| DE | 4422537 A1 | 1/1996 |
| DE | 10008099 A1 | 9/2001 |

* cited by examiner

AIR DAMPER DEVICE HAVING A SEPARATE MOUNTING COMPONENT FOR SIMPLE ASSEMBLY

CROSS REFERENCE TO RELATED APPLICATION

This application claims the benefit of German Patent Application No. 10 2012 213 992.3 filed on Aug. 7, 2012, the disclosure of which is incorporated herein in its entirety by reference.

The present invention relates to an air damper device for a motor vehicle, comprising a device mount which defines a passage opening and on which at least one air damper extending along an air damper longitudinal axis is displaceably mounted in the region of at least one of its longitudinal ends as a mounting longitudinal end relative to the device mount, an opening cross-sectional area of the passage opening being alterable by displacement of the at least one air damper relative to the device mount, the mounting of the mounting longitudinal end of the air damper comprising a mounting component which is formed separately from the air damper and from the device mount.

Air damper devices of this type—which may also be termed air flap devices—are already known from the prior art for proportioning an air flow through the passage opening of the device mount in vehicles in such a way that a unit having a convective cooling requirement and being located behind the passage opening in the through-flow direction is convectively cooled to a sufficient degree.

In many cases, the at least one air damper—which may also be termed air flap—of an air damper device of the prior art—in fact there is often a plurality of air dampers per air damper device—is mounted on the device mount so as to be rotatable about the air damper longitudinal axis relative thereto, in order to alter the opening cross-sectional area of the passage opening by relative displacement relative to the device mount.

In a known generic air damper device, a mounting pin which protrudes in the direction of the air damper longitudinal axis is formed in two pieces on the mounting longitudinal end of the air damper to prevent the oblong air damper from bending about a bending axis orthogonal to the air damper longitudinal axis during fitting of the air damper into the device mount. This is because an air damper of an air damper device is often rotatably mounted on parallel walls of the device mount, an individual wall of the device mount being assigned to each longitudinal end of the air damper for mounting of the air damper. The clearance between the lateral walls mounting the air damper is smaller in this arrangement than the axial spacing of the axially outermost longitudinal ends of the mounting pins connected to the air damper of the prior art. Thus, during fitting of the air damper into the device mount, either the above-mentioned bending of the air damper is required or a bearing is formed in two pieces on a lateral wall, such that the air damper is first inserted together with a mounting pin of a longitudinal end into a corresponding mounting socket on the device mount. The other longitudinal end is then oriented relative to the further mounting socket assigned thereto of the device mount in such a way that the separate mounting pin part can be inserted from the side of the device mount facing away from the air damper into the mounting socket and can be fixed to the air damper-side mounting pin part by separately formed fixing means, such as screws.

When the at least one air damper is assembled in the device mount, excessive bending of the air damper is just as undesirable as the increased complexity of assembly owing to the fixing of the separate mounting pin part to the air damper-side mounting pin part.

The problem addressed by the present invention is therefore that of developing the air damper device of the type mentioned at the outset in such a way that the at least one air damper of the air damper device is movably mountable without excessive mechanical loading and with reduced complexity of assembly, compared with the prior art, on the device mount.

This problem is solved according to the invention by a generic air damper device in which the mounting component has a mounting portion, which is mounted on the device mount so as to be movable relative thereto in the fully assembled state of the air damper device, and has a connection portion which is provided at an axial spacing with respect to the air damper longitudinal axis and connects the mounting portion to the air damper, the radial dimensions of the connection portion orthogonal to the air damper longitudinal axis being smaller over a circumferential region of at least 90° about the air damper longitudinal axis than the radial dimensions of the mounting portion.

In the solution according to the invention, the connection portion ensures that the mounting portion is connected to the assigned air damper in such a way that the air damper can be mounted on the device mount by the sole means of the mounting component without further connection means. For example, the connection portion of the mounting component can be slipped onto an engagement portion of the air damper, and can preferably be slipped on axially for reasons of simple assembly.

The stated radial dimensions of the connection portion and of the mounting portion ensure that the mounting component can be inserted from the side of the device mount facing away from the mounting longitudinal end into a mounting socket of the device mount and can be slipped therethrough until the connection portion is connected to the air damper. The stated radial dimension requirement of the connection portion and of the mounting portion further ensures that the mounting portion can also then be guided sufficiently from a mounting socket for a relative movement relative to the device mount if the connection component is intended to be dimensioned radially larger in portions than the mounting portion for producing a particularly reliable connection. In this case, the mounting socket may have corresponding recess portions through which the connection portion can be guided if, in addition to these larger recess portions, guide portions are provided which rest on the mounting portion for guidance of a relative movement thereof relative to the device mount or which can otherwise cooperate with said mounting portion.

The circumferential region in which the radial dimensions of the connection portion are not larger than the radial dimensions of the mounting portion is preferably divided into a plurality of circumferential sub-regions which are offset relative to one another in the circumferential direction about the air damper longitudinal axis, such that the mounting component on the mounting portion can not only be guided for relative movement but also be secured in terms of its position in the radial direction.

For example, two circumferential sub-regions which are mutually offset by 180° can both be provided at least 45°, the angular extension of the individual circumferential sub-regions not necessarily being equal, although this is preferred. In the same manner, the circumferential region can be subdivided into three circumferential sub-regions at a spacing of approximately 120°, each of which may have an angular extension of at least 30° in the circumferential direction about the air damper longitudinal axis.

The directions "axial(ly)", "radial(ly)" and "in the circumferential direction" used in the present application each relate, unless indicated otherwise, to the air damper longitudinal axis in the fully assembled state of the air damper device and refer to directions along the air damper longitudinal direction, orthogonal thereto and therearound.

Since the mounting portion and the connection portion are provided at an axial spacing from one another, each portion is able to fulfil its function without disrupting function fulfilment by the other portion.

Although a circumferential region of at least 90° about the air damper longitudinal axis, in which region the above-mentioned radial dimension requirement applies, is sufficient for simple assembly with simultaneous good guidance of the relative movement of the mounting component and of the air damper connected thereto relative to the device mount, it is nevertheless preferred for the radial dimensions of the connection portion to be not larger over the entire circumference about the air damper longitudinal axis than the radial dimensions of the mounting portion. In this case, the angular position of the mounting component relative to the air damper longitudinal axis may be of no consequence during assembly since in each possible angular position the connection portion to be connected to the air damper does not project radially beyond the mounting portion mountably received in the device mount.

Although the possibility of the device mount-side mounting socket being polyhedrically enclosed and itself being mounted in turn on the device mount relative thereto should not be excluded, for reasons of a minimum number of necessary components and, in association therewith, for the simplest possible assembly of the air damper device, it is advantageous for the mounting portion to have an at least part-cylindrical configuration. With an at least part-cylindrical configuration of the mounting portion and the receiving thereof in a likewise part-cylindrical or entirely cylindrical device mount-side mounting socket, the relative rotatability, which is the preferred form of relative movement for reasons of simplicity, of the at least one air damper relative to the device mount can be achieved in a simple and robust manner. The mounting portion preferably has an entirely cylindrical configuration and is just as preferably received in an entirely cylindrical mounting socket, and this reduces the area loading of the mounting portion in the mounted state.

It may sometimes be preferable for the connection portion to be formed for the purpose of transmitting torque to the air damper to which it is connected. It thus becomes possible, for example, to drive only one of a plurality of air dampers of an air damper device according to the invention for relative rotation about its air damper longitudinal axis and to transmit the actuating torque exerted onto the directly driven air damper via a suitable rod and/or transmission to the mounting component at least of a further air damper. Part of the stated transmission or rod with which the actuating torque is carried away from the directly driven air damper may also be the mounting component discussed in this application.

Structurally speaking, the formation for torque transmission can be achieved in that the connection portion encompasses a portion of the air damper to which it is connected. In this arrangement, the torque can preferably be transmitted in opposite directions of rotation when the connection portion encompasses the portion of the air damper in a forked manner. Advantageously, the encompassment preferably occurs at a radial spacing from the air damper longitudinal axis acting as an axis of relative rotation, in order to be able to provide maximum leverage of load for torque introduction/removal. Since the torque formed from the product of load and leverage of load leads at a predetermined torque value to a force acting on the air damper which is thus lower, the greater the leverage of load with which the force acts on the air damper. In this case, leverage of load means the radial distance of the force application from the air damper axis of rotation.

The part of the connection portion which encompasses the air damper in a forked manner is preferably symmetrical with respect to a plane including the air damper longitudinal axis or air damper axis of rotation, thereby bringing about force ratios at the air damper and at the connection portion in the two possible torque directions of action which are as identical as possible.

It is thus possible for particularly reliable positive torque transmission to be achieved between the connection portion and the air damper in such a way that the connection portion has encompassment means between which a gap is formed, into which gap the mounting longitudinal end of the air damper can be or is slid. The mounting longitudinal end of the air damper is preferably planar at least in portions, thereby facilitating its insertion into the gap for assembly of the air damper device. The insertion region of the mounting longitudinal end provided for insertion into the gap of the connection portion particularly preferably includes the air damper axis of rotation which preferably coincides with the air damper longitudinal axis.

Although, for durable connection of the connection portion to the air damper during assembly, an application of adhesive to at least one of the components to be joined (connection portion and air damper) may be considered, this is not the preferred solution. Assembly without an additional application of adhesive can be achieved for example in that the connection portion has locking means which are locked via counter-locking means to the air damper to prevent or at least to limit the extent of axial relative movement between the connection portion and the air damper. Positive locking is preferably considered in this case, it being possible to consider releasable locking of the locking means to the counter-locking means of the air damper, this being particularly preferred for maintenance and repair.

For example, the one means of locking means and counter-locking means may have a projection which can be deflected counter to a resilient force and the respective other means may have a corresponding recess for receiving the locking projection.

Preferably, there is also a gap between the locking means of the connection portion, into which gap the mounting longitudinal end of the air damper is inserted when the air damper device is fully assembled. The locking means can thus also contribute to the transmission of torque to and from the air damper.

To keep the geometry simple of the air damper and of the connection portion connected or to be connected thereto, it may be provided for the gap of the encompassment means and the gap of the locking means to lie in a common plane of extension. Thus, both the encompassment means and the locking means of the connection portion may act on the above-mentioned formation of the mounting longitudinal end, which formation is planar at least in portions. For the above-mentioned reasons of ensuring a transmission of maximum stability of torque between the connection portion and the mounting longitudinal end of the air damper at minimum occurring forces and in consideration of an advantageous transmissibility of torque in opposite rotational directions, it can be provided for the encompassment means to be divided in the radial direction and the locking means to be arranged between parts of the divided encompassment means.

The locking projection is preferably formed on the connection portion of the mounting component and can thus contribute to the formation of the gap of the locking means. The locking projection may thus be formed in the manner of a leaf spring which protrudes on one side, an axial protrusion direction starting from the mounting portion being preferred.

To transmit the torques from the one directly driven air damper to the at least one further air damper at minimum transmission forces, it may be provided for the mounting component to be connected to a lever which may jut out in the radial direction from the mounting component. Thus, by means of force introduction at a longitudinal end of the lever which is remote from the mounting component, it is possible to introduce a torque into the mounting component, the force required to introduce the torque being lower the longer the lever at a predetermined torque value. The mounting portion of the mounting component is preferably arranged axially between the lever and the connection portion, such that, in the fully assembled state of the air damper device, it is possible to place the mounting portion on the device mount, the connection portion on the side of the passage opening of the device mount and the lever on the other side of the device mount. This leads to an advantageous compact arrangement in which the lever does not interfere with the passage opening of the device mount.

To transmit torque between air dampers of one and the same air damper device, a movement transmission device can be provided. Using simple means and with simple assembly, this movement transmission device can then be fitted into the air damper device if the lever has a coupling device for coupling to the movement transmission. It is thus possible to directly achieve a force-transmitting and movement-transmitting coupling to the lever of the mounting component. In turn, a compact and robust construction (because its functional portions do not impact upon one another) can be achieved in that the lever is formed between the coupling device and the mounting portion in the axial direction.

Thus, if a particularly reliable positive connection, which is also suitable for transmitting higher forces and torque, is intended to be achieved between the coupling device and the movement transmission device, the coupling device has to be coupled to the movement transmission device so as to be movable relative thereto. Since it is a particularly simple and therefore advantageous option for relative movement, the relative rotatability of the coupling device and the movement transmission device is thus preferred. For this purpose, the coupling device may simply be formed as a pin which is inserted into or penetrates the opening of the movement transmission device. Penetration is preferred in this case since a positive locking engagement can then be achieved between the coupling device and the movement transmission device in a simple but reliable manner, which locking engagement can be released again in an equally simple manner for the purposes of repair and maintenance.

Since the air damper is, as explained at the outset, an oblong component which extends along the air damper longitudinal axis, it is also formed on the longitudinal end opposite the above-discussed mounting longitudinal end for relatively movable mounting on the device mount and in order change the cross-sectional area of the passage opening in a particularly reliable and defined manner. The relative movability of the mounting on the longitudinal end opposite the mounting longitudinal end is ideally the same in this case as that of the mounting longitudinal end, thus preferably being a relative rotatability. For this purpose, the longitudinal end opposite the mounting longitudinal end may have a mounting pin which juts out axially from the air damper and may be integrally formed with the air damper under suitable production methods, such as injection moulding. The air damper and mounting pin can then be formed in a single production step.

Thus, if the force introduction occurs at a longitudinal end of the at least one air damper, for example by a drive, in particular an electromotor drive, the drive longitudinal end is preferably the longitudinal end opposite the mounting longitudinal end. The longitudinal end remote from the drive is then formed as the mounting longitudinal end and connected to the mounting component.

To reinforce the air damper, said air damper may be formed with suitable ribbing or other stiffeners. For example, the air damper may be formed in a central portion along its air damper longitudinal axis having a bulge-type swelling for reinforcement, this bulge-type swelling preferably being formed about the engagement portion of the air damper, which cooperates with the connection portion of the mounting component, so as to be axially shorter than the air damper.

To simplify production, the separately formed mounting component, this being the mounting portion and the connection portion, can also be integrally formed in one piece, for example by means of injection moulding. In the same manner, the above-referenced lever can also be integrally formed with the mounting component. To further simplify production of the mounting component, the above-described coupling portion can also be integrally formed with the lever and thus integrally with the mounting component, such that the mounting component can, even in the form described here entailing a wider range of functions, be produced as one piece in an injection moulding process.

The present invention is described in more detail in the following, with reference to the appended drawings, in which.

Figure 3:
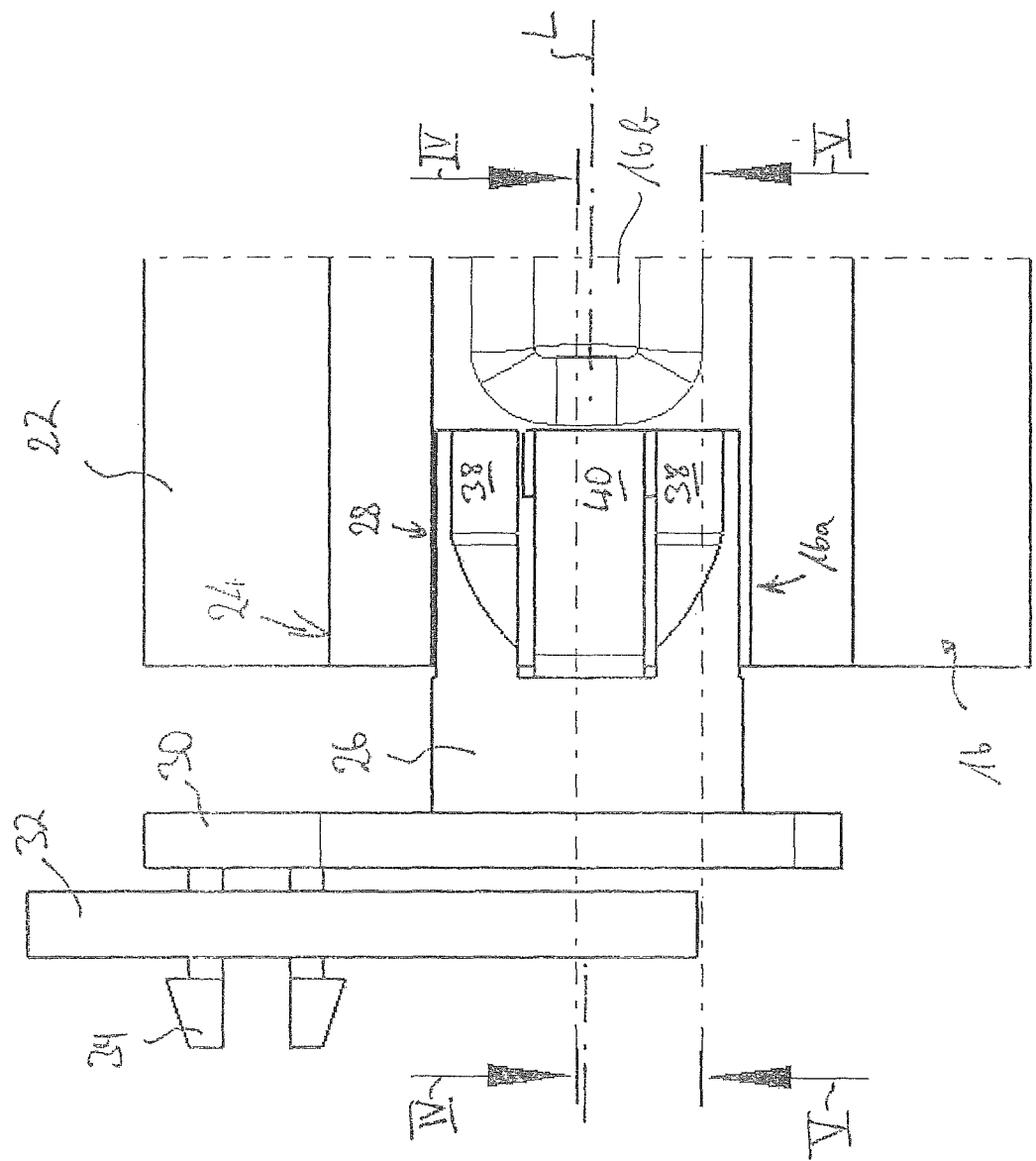
FIG. 3 is a plan view of the mounting longitudinal end of the air damper from FIG. 2.
Figure 4:
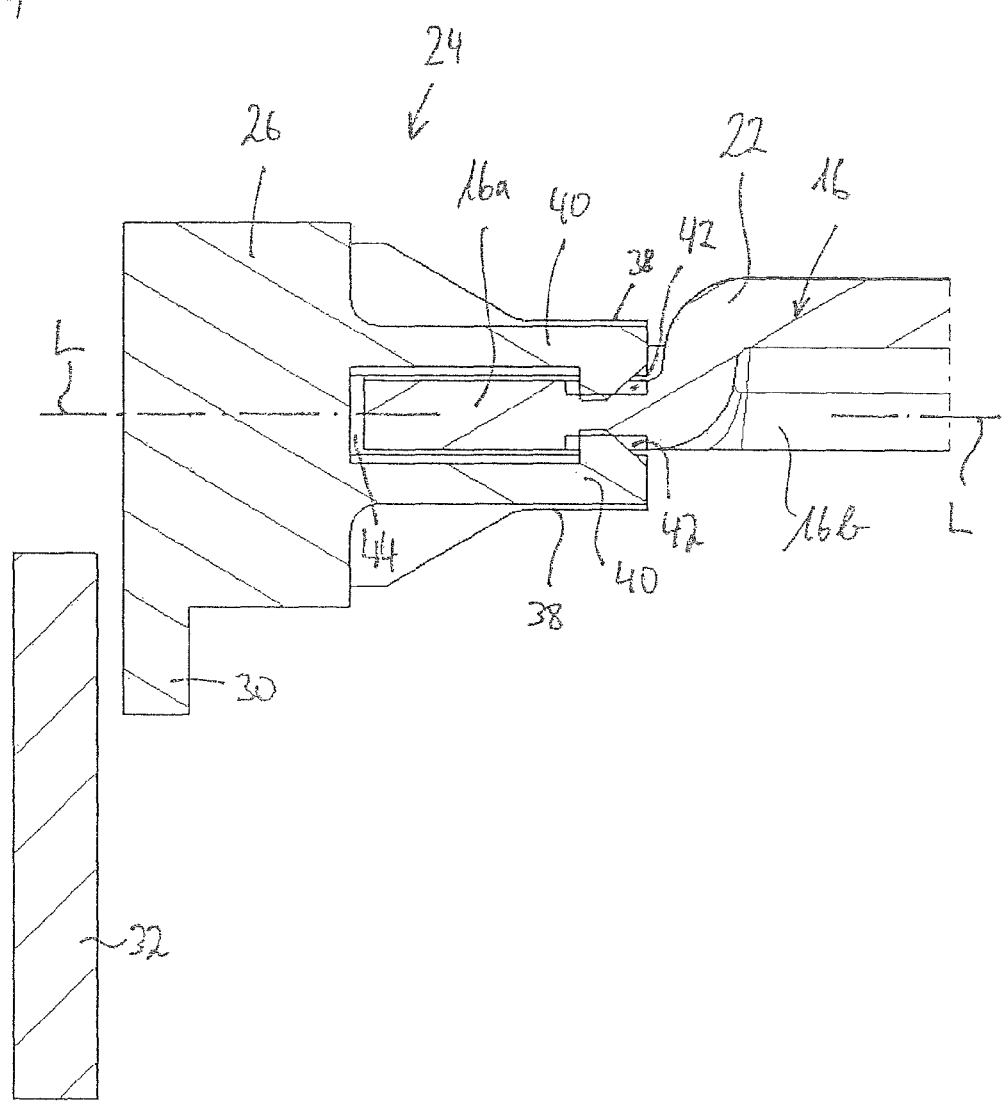
Figure 5:
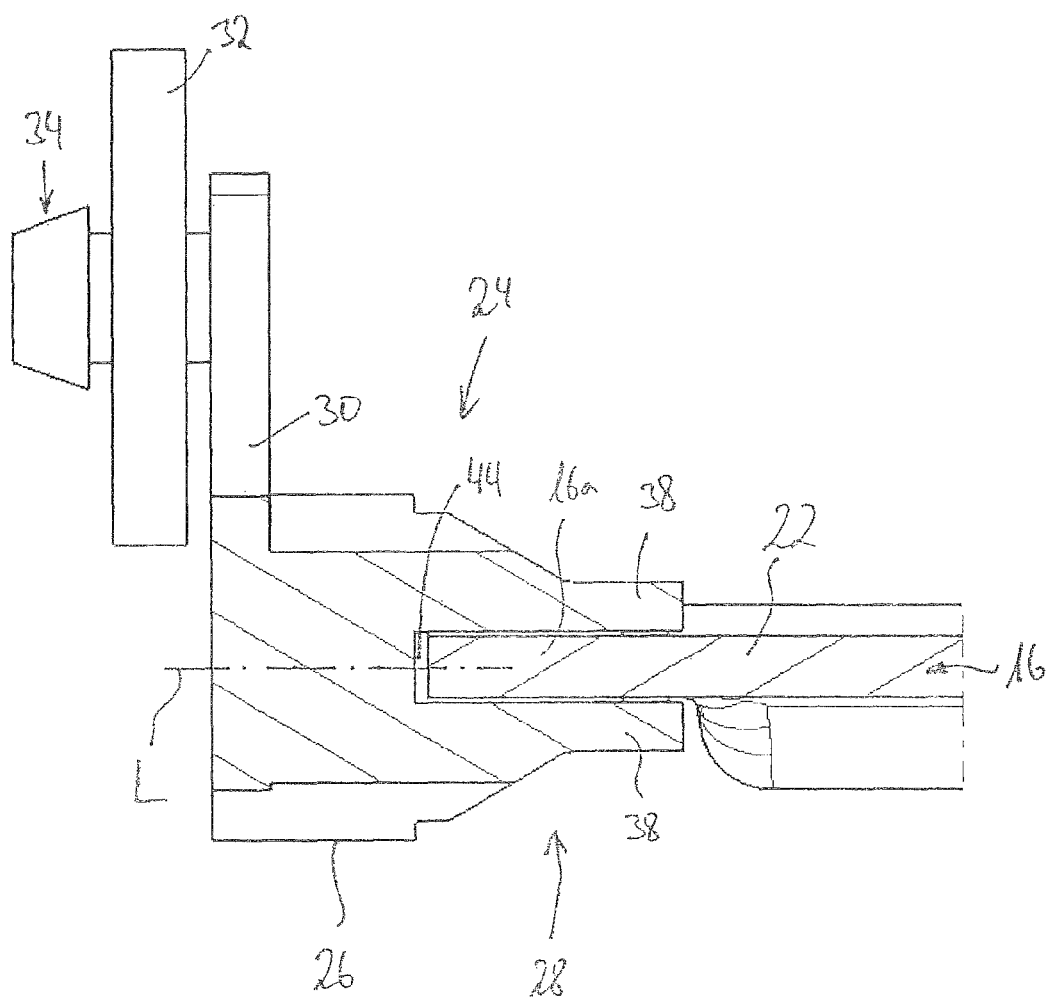

FIG. 4 is a sectional view of the mounting longitudinal end from FIG. 3 in the sectional plane IV-IV which is orthogonal to the plane of the drawing of FIG. 3 in consideration of the viewing direction indicated by the arrows in FIG. 3; and FIG. 5 is a sectional view of the mounting longitudinal end from FIG. 3 in the sectional plane V-V which is orthogonal to the plane of the drawing of FIG. 3 in consideration of the viewing direction indicated by the arrows in FIG. 3.

Figure 1:
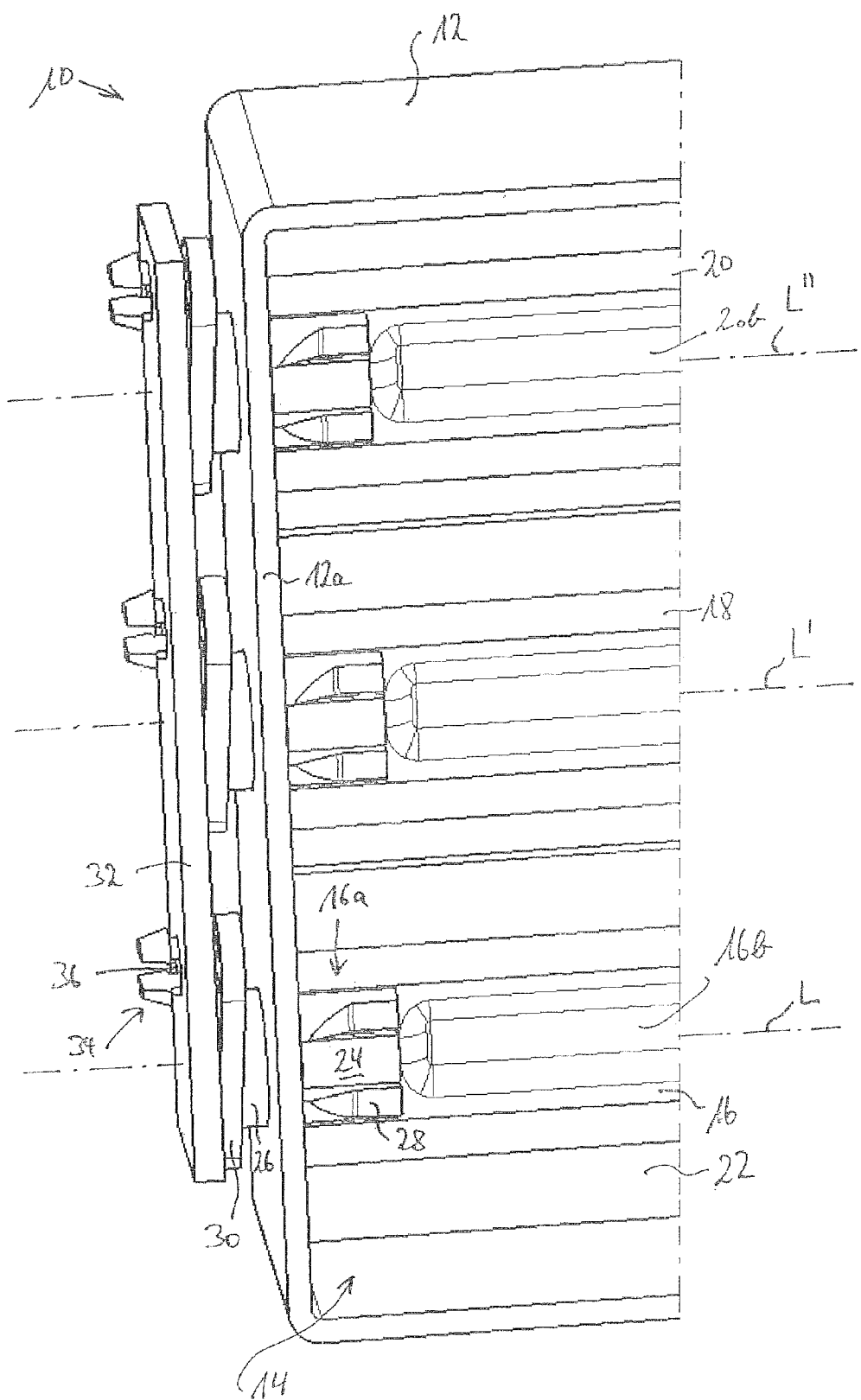
FIG. 1 is a perspective plan view of a mounting region of an embodiment, according to the invention, of an air damper device.

In FIG. 1, an embodiment according to the invention of an air damper device is denoted generally by 10. The air damper device 10 may, as shown in the present example, have a device mount 12 surrounding and thereby defining a passage opening 14.

The air damper device 10 comprises at least one air damper 16, which is mounted, specifically at its two longitudinal ends, of which only the longitudinal end 16a is shown in FIG. 1, on the device mount 12 of the air damper device 10 so as to be movable, preferably so as to be rotatable about an air damper longitudinal axis L.

In the example shown, the air damper device 10 has three air dampers 16, 18 and 20 which are of substantially the same type and can each be rotatably mounted on the device mount 12 about mutually parallel air flap longitudinal axes L, L', and L".

In this arrangement, the air damper device may also have more or less than three air dampers. Since the air dampers 16, 18 and 20 are, moreover, constructed and arranged in substantially the same manner, only the bottom air damper 16 in FIG. 1 is described in detail in the following, it being pointed out that the description thereof can also be applied to the air dampers 18 and 20 of the air damper device 10.

Only the longitudinal end 16a shown in FIG. 1 can be formed as the mounting longitudinal end in the manner described in the following. Preferably, however, the opposite longitudinal end (not shown in FIG. 1) of the air damper 16 is formed in a mirror-inverted manner with respect to a plane which is orthogonal to the air damper longitudinal axis L. In this respect, the following description of the mounting longitudinal end 16a of the air damper 16 applies mutatis mutandis also in relation to the opposite longitudinal end (not shown in FIG. 1) of the air damper 16.

The air damper 16 has a damper component 22 and a mounting component 24 which is connected thereto, preferably being slipped thereon.

The damper component 22 provides most of the air damping area of the air damper 16 and is used to alter the opening cross-sectional area of the passage opening 14 of the air damper device 10 by pivoting about the air damper longitudinal axis L.

The mounting component 24 has a mounting portion 26, such as in the form of a cylindrical shaft, which is mounted in the fully assembled state (shown in FIG. 1) of the air damper device 10 on the device mount 12, more precisely on the wall 12a thereof which is vertical in the intended arrangement so as to be movable relative to said wall, or more precisely so as to be rotatable about the air damper longitudinal axis L.

In the direction of the air damper longitudinal axis, the mounting component 24 has, at an axial spacing from the mounting portion 26, a connection portion 28, by means of which the mounting component 24 is connected to the damper component 22. Thus, the mounting portion 26 which is connected to the connection portion 28 for common movement is also rigidly connected to the air damper 16 and in particular to the damper component 22.

In order for the air damper device 10 to be able to be assembled in a particularly simple manner, the radial dimensions of the connection portion 28—when viewed in the fully assembled state of the air damper device 10—orthogonal to the air damper longitudinal axis L are not larger over a circumferential region of at least 90° about the air damper longitudinal axis L, or even over the entire circumference of 360° in the example shown here, than the radial dimensions of the mounting portion 26. It can thus be ensured that the connection portion 28 is able to be externally inserted through the assigned mounting opening in the device mount 12, in particular in the vertical lateral wall 12a, although the mounting opening in the device mount 12 is formed to receive the mounting portion 26 therein.

In the present example, the mounting portion 26 advantageously has an entirely cylindrical configuration and a cylindrical sleeve resting thereon advantageously entirely encloses the connection portion 28 which follows on from the mounting portion in the axial direction.

Advantageously, the mounting portion 26 can be coupled to a cam lever 30 for common movement, which cam lever may in turn be coupled to a connection web 32, in particular may be coupled by clips in a relatively rotatable yet translationally non-relocatable manner, in order to transmit the movement of an air damper 16 via the connection web 32 to other air dampers, such as the air dampers 18 and 20 shown here.

For this purpose, the mounting components of the air dampers 18 and 20 have identically designed cam levers, such that it is possible to transmit the movement of one air damper to other air dampers of the same type and having a parallel air damper axis without gearing up or down as far as possible. More specifically, it is thus sufficient to provide just one common drive for a group of air dampers coupled by a connection web 32. The movement drive (not shown in the figures) of the air dampers can act either on the air damper or on the connection web 32.

In principle, the cam lever 30 can be coupled via any given suitable coupling device to the connection web 32. For reasons of maximum simplicity of assembly, it is preferable for either the cam lever 30 or the connection web 32 to have an opening and for the respective other component to have a spring clip 34 which can be slipped through the opening of the respective other component and locked to the opening owing to the spring effect of said spring clip. In the example shown, the cam lever 30 has the spring clip 24 and the connection web 32 has a through-opening 36 for receiving the spring clip 34.

As can be seen in FIGS. 2 to 5, the connection portion 28 can encompass an end portion of the air damper 16 or of the damper component 22 in a forked manner. For this purpose, said connection portion may, as an encompassment means, have at least one guide jaw 38—precisely two guide jaws in the present example—on each side of the air damper 16 and may additionally have at least one locking jaw 40, preferably one locking jaw 40 on each side of the air damper 16, which locking jaw is able to engage with a latching recess 42 (see FIG. 4) in the air damper 16. Of course the operational relationship can also be reversed such that the air damper 16 has a latching projection and the locking jaws 40 have a latching recess. In the example shown, the connection portion 28 has precisely one pair of locking jaws 40 which are mutually opposed across the air damper longitudinal axis L.

The locking jaws 40 are preferably located between the guide jaws 38 in the radial direction with respect to the air damper longitudinal axis L. The guide jaws 38 are thus able to transmit a torque from and to the air damper 16, whereas the locking jaws 40 arranged between the guide jaws 38 are loaded only slightly by the torque transmission and can thus secure the latching engagement to the air damper 16 in a reliable and durable manner.

A gap 44 is formed between the locking jaws 40 and the guide jaws 38, which are located on opposite sides of the air damper 16, into which gap a connection end portion of the damper component 22 of the air damper 16 is inserted in the fully assembled state of the air damper device 10.

The air damper 16 may have a curved configuration, preferably in its central portion 16b closest to the air damper axis L, for example having a curved configuration about the air damper longitudinal axis L, thus increasing bending resistance about a bending axis orthogonal to the air damper longitudinal axis L. The air damper longitudinal axis L, which may preferably simultaneously also be the pivot axis of the air damper relative to the device mount 12, preferably extends between the longitudinal ends of the air damper 16 over much of the longitudinal extension of the area of the damper component 22 which is not covered by mounting components 24 outside of the material of the air damper 16, for example over more than 75%, preferably over more than 80%, particularly preferably over more than 85% of the exposed surface of the air damper 16 which is located between mounting components 24.

The mounting component 24 may be built of different parts, although this is not preferred owing to the associated complexity of assembly. The mounting component 24 is preferably injection moulded as one piece, such that at least the mounting portion 26 and the connection portion 28 are formed in one piece with the guide jaws 38 and the locking jaws 40 formed at this location. The lever 30 is particularly preferably also formed in one piece with the spring clip 34 and with the mounting portion 26 and the connection portion 28, such that a mounting component 24 can be ejected ready for assembly from an injection moulding tool in an injection moulding cycle.

Figure 2:
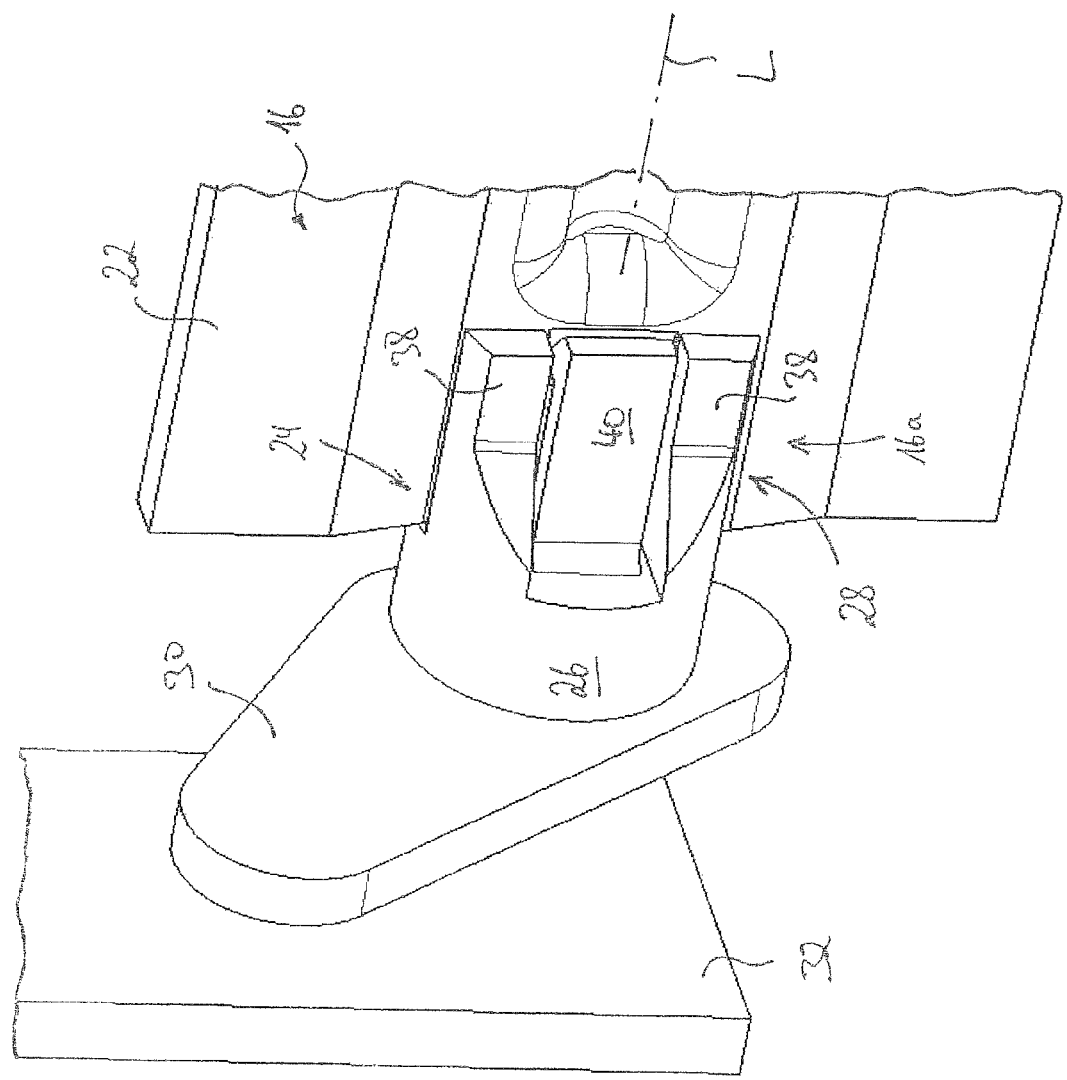
FIG. 2 is a perspective detailed view of the bottom air damper from FIG. 1 with the air damper device mount having been omitted.

As can be seen in FIGS. 1 to 3 in particular, the mounting portion 26 is preferably arranged between the cam lever 30 and the connection portion 28 in the axial direction with respect to the air damper longitudinal axis L. The cam lever 30 is thus advantageously located outside the passage opening 14 surrounded by the device mount 12, such that said cam lever does not interfere with said passage opening and is not impacted by processes within the device mount.

Coupling of the connection web 32 to the cam lever 30 is facilitated in that said cam lever is in turn located axially between the spring clip 34 and the mounting portion 26.

The present invention considerably reduces the complexity of assembling an air damper device.

The invention claimed is:

1. Air damper device for a motor vehicle, comprising:
a device mount which defines a passage opening and on which at least one air damper extending along an air damper longitudinal axis is displaceably mounted in the region of at least one of its longitudinal ends as a mounting longitudinal end relative to the device mount, an opening cross-sectional area of the passage opening being alterable by displacement of the at least one air damper relative to the device mount, the mounting of the mounting longitudinal end of the air damper comprising a mounting component which is formed separately from the air damper and from the device mount;
wherein the mounting component has a mounting portion which is mounted on the device mount so as to be movable relative thereto in a fully assembled state of the air damper device and has a connection portion which is provided at an axial spacing thereto with respect to the air damper longitudinal axis and connects the mounting portion to the air damper;
the connection portion and the mounting portion each having radial dimensions orthogonal to the air damper longitudinal axis, the radial dimensions of the connection portion being not larger over a circumferential region of at least 90° about the air damper longitudinal axis than the radial dimensions of the mounting portion; and
wherein the mounting component is connected to a lever such that the mounting portion is arranged axially between the lever and the connection portion.

2. Air damper device according to claim 1, wherein the radial dimensions of the connection portion are not larger over the entire circumference about the air damper longitudinal axis than the radial dimensions of the mounting portion.

3. Air damper device according claim 1, wherein the mounting portion is at least part-cylindrical.

4. Air damper device according to claim 1, wherein the connection portion encompasses a portion of the air damper to which it is connected.

5. Air damper device according to claim 4, wherein the connection portion has encompassment means between which a gap is formed, into which gap the mounting longitudinal end of the air damper can be or is slid.

6. Air damper device according to claim 5, wherein the connection portion has locking means which are locked via counter-locking means to the air damper to prevent or at least to limit the extent of axial relative movement between the connection portion and the air damper.

7. Air damper device according to claim 6, wherein a gap is formed between the locking means, in which gap the mounting longitudinal end of the air damper is slid.

8. Air damper device according to claim 7, wherein the gap of the encompassment means and the gap of the locking means lie in a common plane of extension.

9. Air damper device according to claim 8, wherein the encompassment means are divided in the radial direction and the locking means are arranged between parts of the divided encompassment means.

10. Air damper device according to claim 1, wherein the lever has a coupling device for coupling to a movement transmission device.

11. Air damper device according to claim 10, wherein the coupling device is locked to the movement transmission device so as to be movable relative to the movement transmission device.

12. Air damper device according to claim 10, wherein the coupling device is locked to the movement transmission device so as to be rotatable relative to the movement transmission device.

13. Air damper device according to claim 1, wherein the air damper is likewise formed at its longitudinal end opposite the mounting longitudinal end for relatively movable mounting on the device mount.

14. Air damper device according to claim 1, wherein the mounting portion and the connection portion are integrally formed.

15. Air damper device according claim 1, wherein the mounting portion is entirely cylindrical.

16. Air damper device according to claim 1, wherein the connection portion encompasses a portion of the air damper to which it is connected in a forked manner.

17. Air damper device according to claim 1, wherein the lever has a coupling device for coupling to a movement transmission device, the lever-being formed between the coupling device and the mounting portion in the axial direction.

18. Air damper device according to claim 1, wherein the mounting portion, the connection portion, and the lever are integrally formed with the mounting component.

19. Air damper device according to claim 18, wherein the lever has a coupling device for coupling to a movement transmission device mounting portion, the coupling device being integrally formed with the mounting component.

* * * * *